No. 725,888.
PATENTED APR. 21, 1903.
J. F. SMITH, Jr.
SELF LUBRICATING JOURNAL BOX.
APPLICATION FILED OCT. 15, 1902.
NO MODEL.
2 SHEETS—SHEET 1.
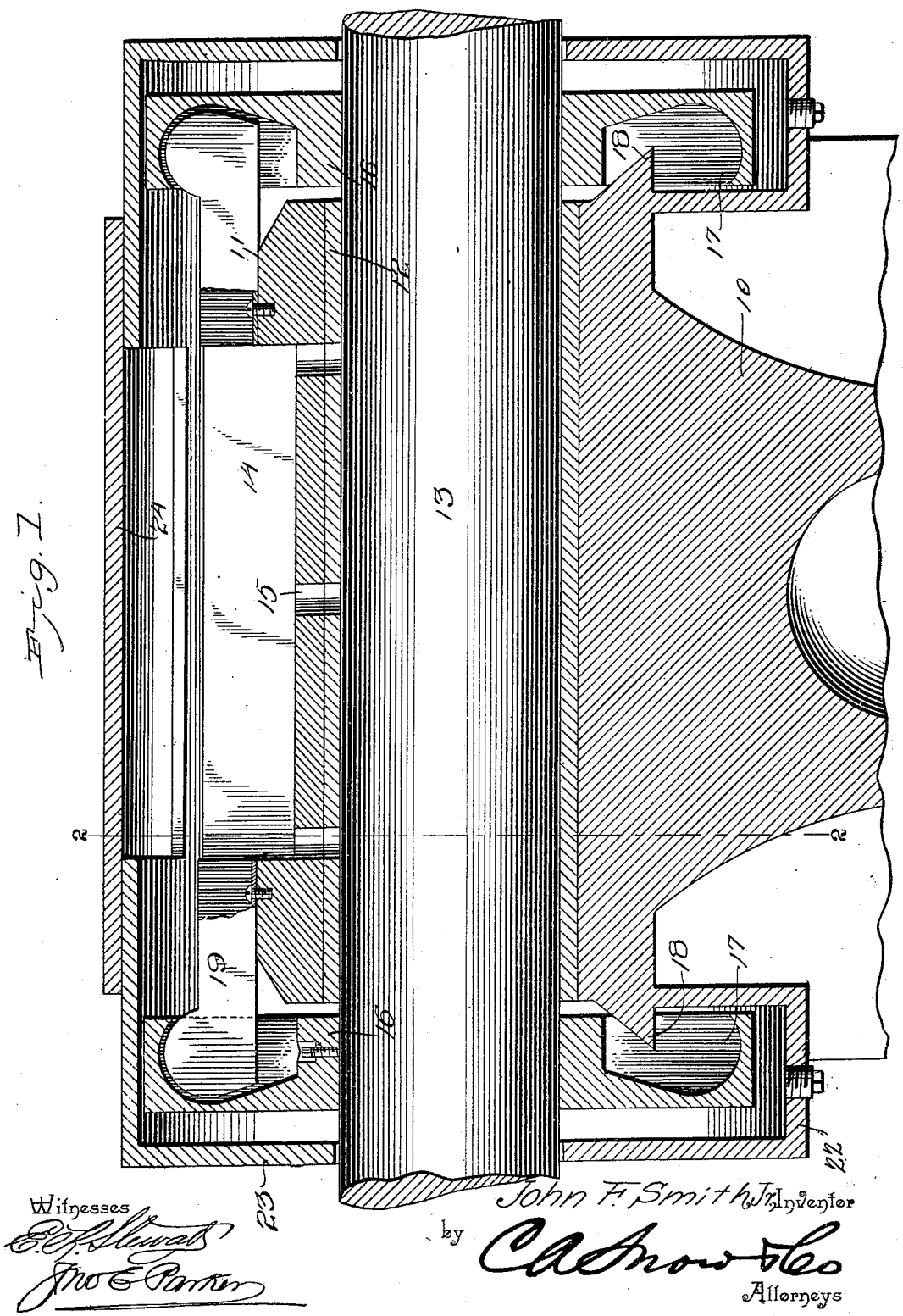

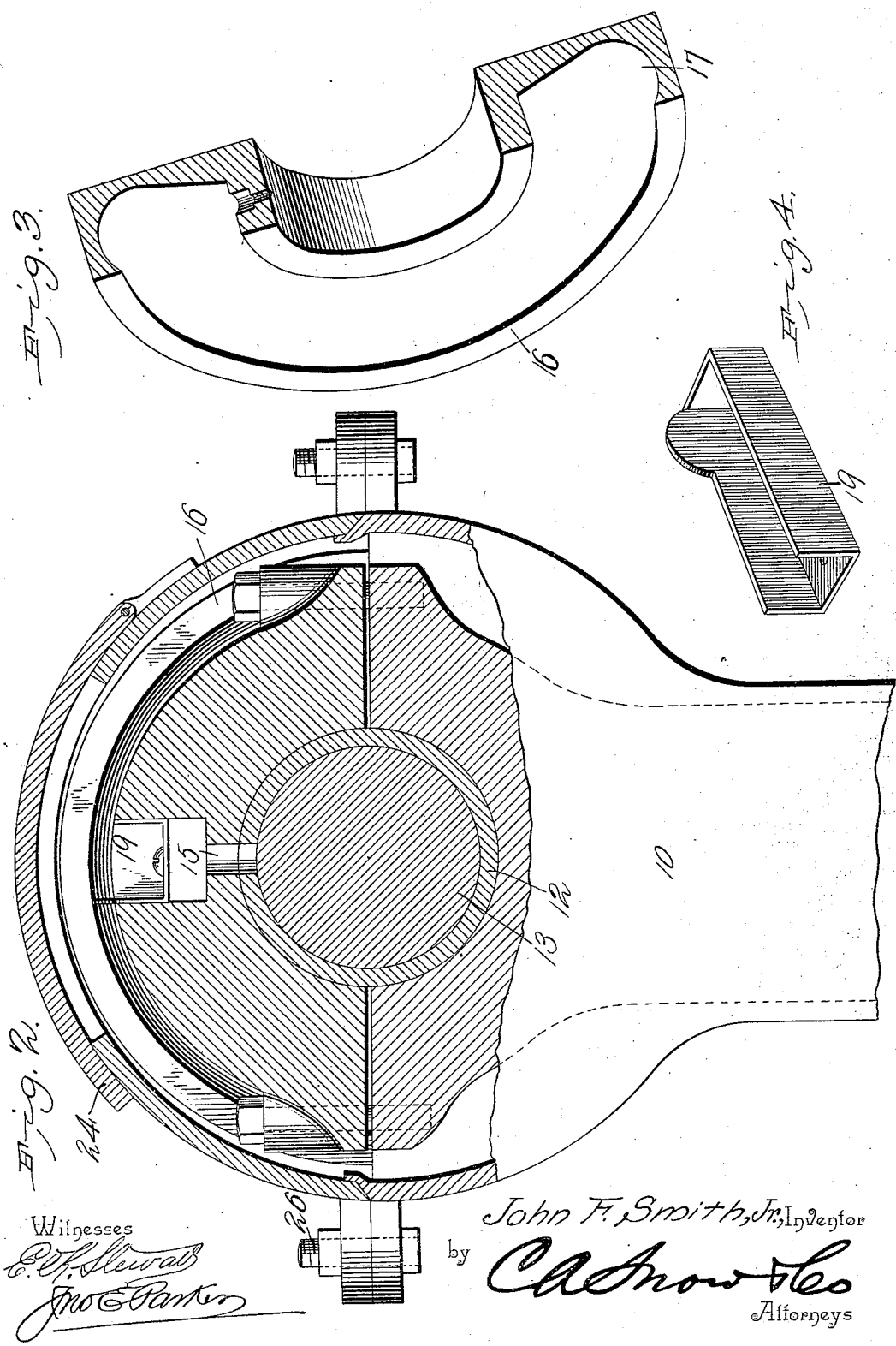

UNITED STATES PATENT OFFICE.

JOHN F. SMITH, JR., OF EAU CLAIRE, WISCONSIN, ASSIGNOR OF ONE-THIRD TO JOSEPH P. ROSS, OF EAU CLAIRE, WISCONSIN.

SELF-LUBRICATING JOURNAL-BOX.

SPECIFICATION forming part of Letters Patent No. 725,888, dated April 21, 1903.

Application filed October 15, 1902. Serial No. 127,408. (No model.)

*To all whom it may concern:*

Be it known that I, JOHN F. SMITH, Jr., a citizen of the United States, residing at Eau Claire, in the county of Eau Claire and State of Wisconsin, have invented a new and useful Self-Lubricating Journal-Box, of which the following is a specification.

The invention relates to certain improvements in journal-boxes, and has for its principal object to provide an improved form of self-lubricating box or bearing in which the lubricant draining from the bearing will be caught and automatically returned to a position above the shaft for further use.

A further object of the invention is to provide a self-lubricating bearing of simple and economical construction which will require attention only at long intervals and in which all of the parts are protected from dust and dirt.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a longitudinal sectional elevation of a journal-box constructed in accordance with the invention. Fig. 2 is a transverse sectional elevation of the same on the line 2 2 of Fig. 1. Fig. 3 is a sectional perspective view of the draining-collar detached. Fig. 4 is a perspective view of the drain-spout for conveying the oil from the collar to the upper reservoir.

Similar numerals of reference are employed to indicate corresponding parts throughout the several figures of the drawings.

The bearing is formed of two members bolted together, as usual, and comprising the lower pillow or base 10 and the cap 11, these members being provided with an internal bushing 12, of Babbitt or other metal, for the reception of the shaft or axle 13. These members may be arranged in the form of a block, hanger, or other two-part support for the reception of any form of revoluble shaft or axle. The cap 11 is provided with a central recess 14 of any dimensions to form a lubricant-reservoir, and said reservoir communicates with the shaft through openings 15, the diameter of the openings being governed by the diameter of the shaft and the quality of lubricant employed. Secured to the shaft at each end of the bearing is a collar 16, provided with an annular groove 17, of which the outermost portion forms an oil-receiving recess, and into the lower portion of the groove project inclined ribs or flanges 18, formed integral with the pillow or base and adapted to convey any lubricant passing beyond the end of the bearing to a point within the groove 17. At each end of the cap is secured a drain-spout 19, which may be formed of sheet metal bent to form an elongated rectangular box open at the top and at one end, the open end communicating with the reservoir 14. One of the vertical walls of the drain-spout is of a contour corresponding to that of the wall of the groove 17 and without actually coming into contact with the wall of the groove forms a scraper for the removal of the film of oil which will cling to the groove or in the case of a rapidly-revolving shaft will be held under the influence of centrifugal force against the outer wall of said groove. The scraping-plates serve to remove the oil from the grooves and convey the same to the reservoir, from whence it passes through the openings 15 to the shaft and is again conveyed by the ribs or flanges 18 to said groove.

The circulation of the oil, while comparatively slow, is continuous and there is little or no waste and the initial supply may be sufficient to keep the bearing in good condition for a considerable length of time.

In order to prevent the accumulation of dust and dirt, the bearing is inclosed by a casing made in two sections, 22 and 23, the lower section being secured to or formed integral with the base or pillow and inclosing the ends of the bearing and the lower portion of the collar, while the upper section 23 is secured to the cap and is provided with a hinged lid or cover 24, which may be opened when it becomes necessary to renew the supply of lubricant. The lid and the opening which it covers are preferably of such length as to extend the full length of the cap-piece proper in order that access may be had to the spouts and reservoir in the event of clogging and to permit cleansing and repairs. The two sections of the casing preferably overlap at a point in alinement with the axis of the shaft to prevent the entrance of dust at the joint, and the two portions of the casing are secured together by bolts 26, as indicated in Fig. 2.

Should there be any accumulation of oil in the lower portion of the casing, it will overflow into the groove 17 and be carried up and delivered to the reservoir, so that leakage from the casing proper is prevented.

As the device is applicable to any form of bearing, the term "journal-box" has been used in the claims to designate a bearing-block, hanger, or any other form of bearing for the support of a revoluble shaft or axle.

Having thus described my invention, what I claim is—

1. The combination with a journal-box having an upper lubricant-reservoir and adapted for the support of a shaft, of a grooved collar carried by the shaft, there being a rib or flange projecting from the end of the bearing for directing the lubricant into the groove, and a drain-spout carried by the upper member of the journal-box and having one wall shaped to conform to the contour of the groove and serving to remove the lubricant from the collar and deliver the same to the reservoir.

2. The combination in a journal-box, of the upper and lower members adapted for the reception of a shaft, a lubricant-reservoir formed in the upper member and in communication with the shaft, a grooved collar carried by the shaft and adapted to receive and contain lubricating material draining from the reservoir, the lower journal-box member being provided with a projecting inclined rib or flange for directing the lubricant into the groove, a casing encircling the collar and forming a drainage-reservoir for the accumulation of excess of lubricant, and a drain-spout carried by the upper journal-box member and projecting into the groove.

3. The combination in a journal-box, of the upper and lower members adapted for the reception of a shaft, a lubricant-reservoir formed in the upper member and in communication with said shaft, grooved collars carried by the shaft at each end of the bearing, there being ribs or flanges projecting from the opposite end of the lower member to a point within the grooves, drain-spouts carried by the upper member and extending within said grooves, a casing encircling the ends of the journal-bearing, the reservoir and the collars, said casing having an open top portion, and a cover or lid for closing said opening.

In testimony that I claim the foregoing as my own I have hereto affixed my signature in the presence of two witnesses.

JOHN F. SMITH, Jr.

Witnesses:
   Geo. L. Blum,
   Edward Ott.